United States Patent
Togawa et al.

(10) Patent No.: US 7,062,119 B2
(45) Date of Patent: Jun. 13, 2006

(54) OPTICAL DEVICE

(75) Inventors: Masayuki Togawa, Kanagawa (JP);
Morio Kobayashi, Kanagawa (JP);
Minoru Takeda, Kanagawa (JP);
Masahiro Kanbara, Kanagawa (JP)

(73) Assignee: Teijin Seiki Co., Ltd., Tokyo (JP)

( * ) Notice: Subject to any disclaimer, the term of this patent is extended or adjusted under 35 U.S.C. 154(b) by 195 days.

(21) Appl. No.: 10/379,619

(22) Filed: Mar. 5, 2003

(65) Prior Publication Data

US 2003/0169973 A1 Sep. 11, 2003

(30) Foreign Application Priority Data

Mar. 5, 2002 (JP) ............................ P2002-058864

(51) Int. Cl.
*G02B 6/26* (2006.01)

(52) U.S. Cl. .......................................... 385/16; 385/25
(58) Field of Classification Search ............ 385/16–23, 385/25, 140, 36, 39
See application file for complete search history.

(56) References Cited

U.S. PATENT DOCUMENTS 4,946,236 A * 8/1990 Dautartas et al. ............. 385/17
5,594,820 A * 1/1997 Garel-Jones et al. .......... 385/22
2002/0009256 A1* 1/2002 Chertkow et al. ............ 385/18
2002/0181069 A1* 12/2002 Brown et al. ............... 359/290

FOREIGN PATENT DOCUMENTS

JP 59-212802 * 12/1984 .................. 385/16

* cited by examiner

*Primary Examiner*—John D. Lee
*Assistant Examiner*—Mike Stahl
(74) *Attorney, Agent, or Firm*—Akin Gump Strauss Hauer & Feld, LLP

(57) ABSTRACT

The invention is to offer an optical device which is capable of reducing the insertion loss comparing with a conventional one. The optical switch comprises a fiber collimator for input an light beam, a fiber collimator for output the light beam to the outside, an optical path switching element, an optical path switching element as well as a slider arranged in the optical paths between the fiber collimator and the fiber collimator to change the light path and the optical characteristics, a solenoid actuator for moving the slider, a guide mechanism for guiding the slider as the slider moves, a magnet for generating a magnetic field, the magnet being arranged at a position where the slider is pressed against the guide mechanism by means of a magnetic force of a magnetic field generated by the magnet.

4 Claims, 8 Drawing Sheets

PRIOR ART

OPTICAL DEVICE

The present application is based on Japanese Patent Application No. 2002-58864, the entire contents of which are incorporated herein by reference.

BACKGROUND OF THE INVENTION

1. Field of the Invention

The present invention relates to an optical device such as an optical switch or a variable optical attenuator provided with optical elements such as mirrors, prisms, or shutter used in the field of optical communications as optical information networks, or optical LAN.

2. Related Art

So far, as this type of optical devices, an optical switch 900 is known as shown in, for example, FIG. 10.

The optical switch 900 is a 2×2 optical switch of two inputs and two outputs having optical fibers 911, 921 and lenses 912, 922 to form input ports 910a, 920a, and having fiber collimators 910, 920 for making passing light beams to be parallel, optical fibers 931, 941 and lenses 932, 942 to form output ports 930a, 940a and having fiber collimators 930, 940 for making passing light beams to be parallel.

Further, the optical switch 900 is provided with an optical path switching element 950 having right-angled prisms 951, 952, a support plate 960 for supporting the optical path switching element 950, a drive actuator 970 such as a solenoid actuator for moving the optical path switching element 950 in directions as shown by arrows 950a and 950b, a guide mechanism 980 for guiding the optical path switching element 950 moved by the drive actuator 970, and a coupling mechanism 990 for connecting the drive actuator 970 and the guide mechanism 980.

The optical switch 900 moves the optical path switching element 950 in the direction shown with the arrow 950a by the drive actuator 970 and draws it out between the fiber collimators 910, 920 and the fiber collimators 930, 940, thereby to allow light beams output at the fiber collimators 910, 920 to enter directly into the fiber collimators 930, 940.

On the other hand, the optical switch 900 moves the optical path switching element 950 in a direction shown with the arrow 950b by the drive actuator 970, and inserts it between the fiber collimators 910, 920 and the fiber collimators 930, 940, so that, as shown in FIG. 10, the light beams output at the fiber collimators 910, 920 are reflected twice by the right-angled prisms 951, 952 of the optical path switching element 950 to be received by the fiber collimators 940, 930, respectively.

Namely, in dependence upon inserting the optical path switching element 950 into or retracting from the position between the fiber collimators 910, 920 and the fiber collimators 930, 940, the optical switch 900 may switch the optical paths so that light beams output at the fiber collimator 910 and the fiber collimator 920 are received by the fiber collimator 930 and the fiber collimator 940 respectively, or so that the optical paths through which the light beam output at the fiber collimators 910, 920 are received by the fiber collimator 940 and the fiber collimator 930 respectively.

Incidentally, in the optical switch 900, it is desirable that the insertion loss is small in case the optical path switching element 950 is absent in the optical path as well as in case the optical path switching element 950 is located for switching the optical path.

In order to reduce the insertion loss when switching the optical paths, in case the optical path switching element 950 is arranged in the optical path, it is required to reduce the loss of the light beams when receiving the light beams output from the fiber collimators 910, 920 forming input ports 910a, 920a by the fiber collimators 930, 940 forming output ports 930a, 940a.

Under a condition that the optical path switching element 950 is drawn out from between the fiber collimators 910, 920 and the fiber collimators 930, 940, in case the light beams output from the fiber collimators 910, 920 are received by the fiber collimators 930, 940, the insertion loss may be reduced by decreasing dislocation of an optical axis from the fiber collimator 910 and fiber collimator 930 and by decreasing the dislocation of the optical axis from the fiber collimator 920 and fiber collimator 940.

Further, under a condition that the optical path switching element 950 is inserted between the fiber collimators 910, 920 and the fiber collimators 930, 940, in case the light beams output from the fiber collimators 910, 920 are received by the fiber collimators 930, 940, the insertion loss may be reduced by decreasing the dislocation from the light beam 900a output from the fiber collimator 910 and reflected twice by the right-angled prism 951 and from the optical axis of the fiber collimator 940 and by decreasing the dislocation from the light beam 900b output from the fiber collimator 920 and reflected twice by the right-angled prism 952 and from the optical axis of the fiber collimator 930.

Herein, in case the optical path switching element 950 is not located in the optical path, dislocations of optical axes from the fiber collimator 910 and the fiber collimator 930, or from the fiber collimator 920 and the fiber collimator 940 may be adjusted by controlling and fixing positions and angles of the fiber collimators 910, 920, 930, 940. But, dislocations of the optical axes from the light beam 900a and the fiber collimator 940, or from the light beam 900b and the fiber collimator 930 cannot be adjusted, unless adjusting the positions and the angles of the optical path switching element 950 in addition to the positional adjustment of the fiber collimators 910, 920, 930, 940.

Namely, under the condition that the optical path switching element 950 is inserted into between the fiber collimators 910, 920 and the fiber collimators 930, 940, the light beams output from the fiber collimators 910, 920 are received by the fiber collimators 930, 940 through the optical path switching element 950. Therefore, in comparison with the condition that the optical path switching element 950 is drawn out from between the fiber collimators 910, 920 and the fiber collimators 930, 940, it is difficult to reduce the loss of the light beams output at the fiber collimators 910, 920 when entering into the fiber collimators 930, 940.

The invention will be described more in detail in reference to FIG. 11. In the same, the angle 951a of the right-angled prism 951 is 90° and the angle 951b is 45°. A ridgeline of a portion of the angle 951a of the right-angled prism 951 is set as a z-axis, the optical axis of fiber collimator 910 is set as an x-axis, and the rotation angles around the x, y and z axes are set as the rotation angles θ, φ and ϕ respectively.

In case the light beam 900a output from the fiber collimator 910 and reflected twice by the right-angled prism 951 is dislocated as shown by Δϕ in a direction of rotation angle ϕ from an angle designed by the optical path switching element 950, there occurs angular dislocation from the optical axis 940b of the fiber collimator 940.

Further, although not illustrated, in case the light beam 900a is dislocated from the position designed by the optical path switching element 950, or dislocated in the rotating direction θ or in the rotating direction φ from the angle designed by the same, the light beam 900*a* does not cause angular dislocation from the optical axis 940*b* of the fiber collimator 940, but causes positional dislocation.

Herein, as to the loss of the light beams output from the fiber collimators 910, 920 when entering the fiber collimators 930, 940, the angular dislocation of the light beam 900*a* and the optical axis 940 from the optical axis 940*b* is larger than the positional dislocation of the light beam 900*a* and the fiber collimator 940 from the optical axis 940*b*.

For example, in case a diameter of the light beam 900*a* is 0.5 mm and a tolerable coupling loss is 0.2 dB, the angular dislocation between the light beam 900*a* and the optical axis 940*b* of the fiber collimator 940 is tolerable until 0.05 mm in practically measuring, while the positional dislocation between the light beam 900*a* and the optical axis 940*b* of the fiber collimator 940 is tolerable at only 0.02°.

The positional dislocation between the light beam 900*a* and the optical axis 940*b* of fiber collimator 940 may be adjusted to 0.01 mm or less by use of a guide mechanism 980 or other positioning instruments. It is, however, extremely difficult to adjust the angular dislocation between the light beam 900*a* and the optical axis 940*b* of fiber collimator 940 to 0.02 mm or less in comparison with adjustment of the positional dislocation between the light beam 900*a* and the optical axis 940*b* of the fiber collimator 940 is made 0.01 mm or less.

As to the conventional optical switch 900, in order to render the angular dislocation between the light beam 900*a* and the optical axis 940*b* of the fiber collimator 940 to 0.02 mm or less, a mechanism called as a precision guide structure is employed, which is disposed, in a guide mechanism 980, between a guide member having more than two fixed guide surfaces and a slider arranged between the more than two fixed guide surfaces and carrying the optical path switching element 950 as keeping a space from the guide member.

However, according to the optical switch 900, there are problems that, when switching the optical path, it is difficult to insert the optical path switching element 950 into the optical path at a high angular precision with reduction of the insertion loss.

Namely, the precision guide structure has been involved with problems that it is required that the gap between the fixed guide surface and the slider is designed and processed to be 0.001 mm or less for regulating the angular dislocation of the optical path switching element to be 0.02° or less, bringing about cost-up and less endurance. Further, when the slider moves, the fixed guide surfaces and the slider surfaces are worn to reduce dimensions. In short, the gap between the two fixed guide surfaces and the slider is widened and mechanical play is created. The mechanical play enlarges an inclining angle of the optical path switching element, increase the loss of light, and weakens characteristics of the optical switch. Endurance against number of movements of the slider is required.

As a structure other than a slide bearing structure such as the precision guide structure, a roller bearing structure using the bearing may be considered, but since bearing balls or rods are worn owing to ten thousands of movements of the slider, it is extremely difficult to maintain the precision of the optical path switching element and the angle of the slider being 0.02° or less.

SUMMARY OF THE INVENTION

It is, therefore, an object of the invention to provide an optical device which may reduce the insertion loss in comparison with the conventional device.

(1) For solving the above mentioned problems, the optical device of the invention comprises a light input device for receiving a light beam from an outside, a light output device for outputting the light beam received by the light input device to an outside, a light changing member arranged in an optical path between the light input device and the light output device for changing the light beam, an actuating device for moving the light changing member, a movement-guiding member for guiding movement of the light changing member by the member-moving device, and a magnetic field generating unit for generating a magnetic field, said magnetic field generating unit being arranged at a position of pressing the light changing member against the movement-guiding member via magnetic force by the generated magnetic field.

With this structure, since the optical device of the invention magnetically presses the light changing member against the guide member, the dislocation of the light changing member from a designed angular position may be controlled to be small in comparison with the conventional optical device, so that the insertion loss is decreased. Further, according to the optical device of the invention, it is possible to prevent the light changing member from moving relative to the guide member owing to outside vibrations.

Further, according to the optical device of the invention, at least a part of the light changing member is a ferromagnetic substance, and is formed with a groove at a position of changing the magnetic force via the magnetic field generated by the magnetic field generating unit when said part is moved and changed as to position.

With this structure, according to the optical device of the invention, since the light changing member is formed with the groove so as to reduce friction between the light changing member and the guide member when the light changing member moves, it is possible to decrease abrasion of the light changing member and the guide member and to maintain the insertion loss for a longer period of time. Further, according to the optical device of the invention, since the groove is formed in the light changing member for reducing friction between the light changing member and the guide member when the light changing member moves, it is possible to lower the drive force of the light changing member of the member-moving device and save the electric power.

Further, according to the optical device of the invention, a plurality of magnetic field generating units are arranged.

With this structure, since the optical device of the invention is provided with a plurality of magnetic field generating unit, magnetism of which is possible to reduce in external environments and in time-passing, reduction of magnetism may be restrained as a whole in comparison with the magnetic field generating unit not divided in plural parts, and the insertion loss may be maintained for a longer period of time. Incidentally, in case the plurality of magnetic field generating units are provided at positions of magnetically connecting the magnetic field generating unit one another, it is possible to further restrain the reduction of magnetism in each of the magnetic field generating unit in the external environments and in the time-passing, and to maintain the insertion loss for a longer period of time.

Further, according to the optical device of the invention, the magnetic field generating unit includes first magnetic field generating unit fixed to the light changing member and second magnetic field generating unit arranged at a predetermined position with respect to the movement-guiding member.

With this structure, according to the optical device of the invention, even if the light changing device cannot be positioned as predetermined in relation to the movement-guiding member by the member-moving device, it is possible to position the light changing device in relation with the movement-guiding member owing to magnetic force generated between the first magnetic field generating unit and the second magnetic field generating unit.

Further, according to the optical device of the invention, the first magnetic field generating unit and the second magnetic field generating unit are arranged at positions which changes the magnetic force by the magnetic field generated in response to the movement of the light changing member changing.

With this structure, according to the optical device of the invention, since the first magnetic field generating unit and the second magnetic field generating unit are disposed so as to reduce friction between the light changing member and the guide member when the light changing member moves, it is possible to decrease abrasion of the light changing member and the guide member and to maintain the insertion loss for a longer period of time. Further, according to the optical device of the invention, since the first magnetic field generating unit and the second magnetic field generating unit are disposed so as to reduce friction between the light changing member and the guide member when the light changing member moves, it is possible to lower the drive force of the light changing member of the member-moving device and to save the electric power.

DETAILED DESCRIPTION OF THE PREFERRED EMBODIMENTS

Explanations will be made to embodiments referring to the attached drawings.

First Embodiment

Firstly, a structure of the optical device of the first embodiment will be explained.

Figure 1:
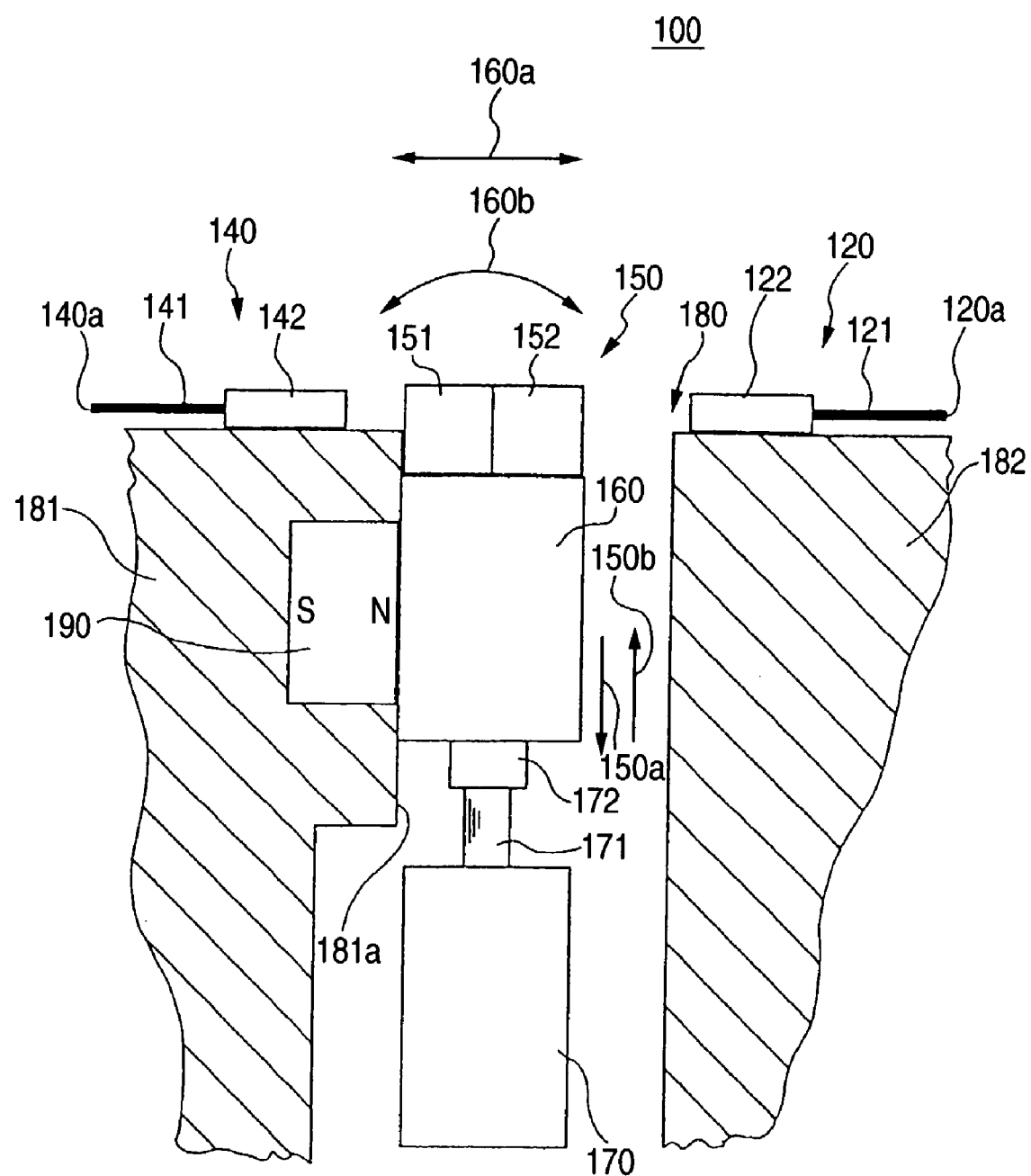
FIG. 1 is a cross sectional view of the optical switch of the first embodiment of the invention.
Figure 2:
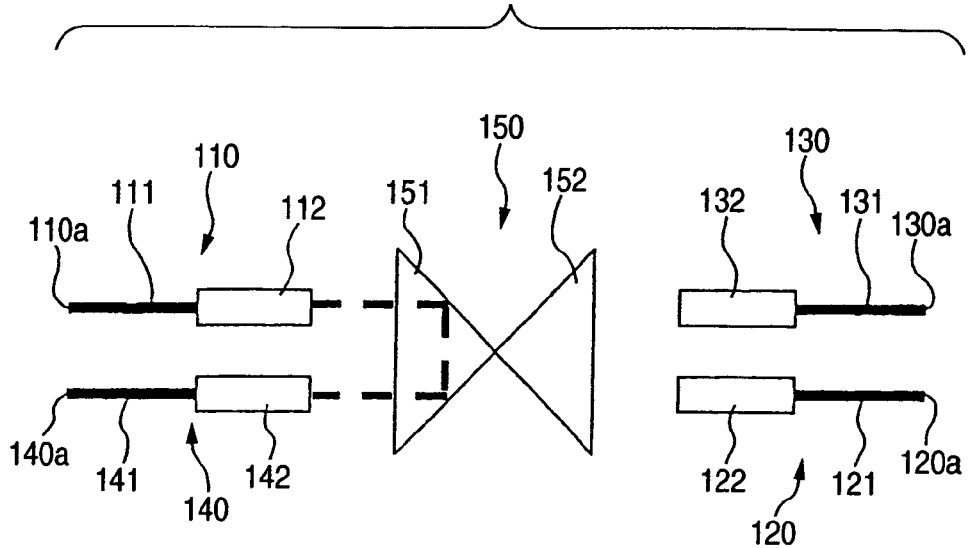
FIG. 2 is an upper plan view of the optical switch of FIG. 1.
Figure 3:
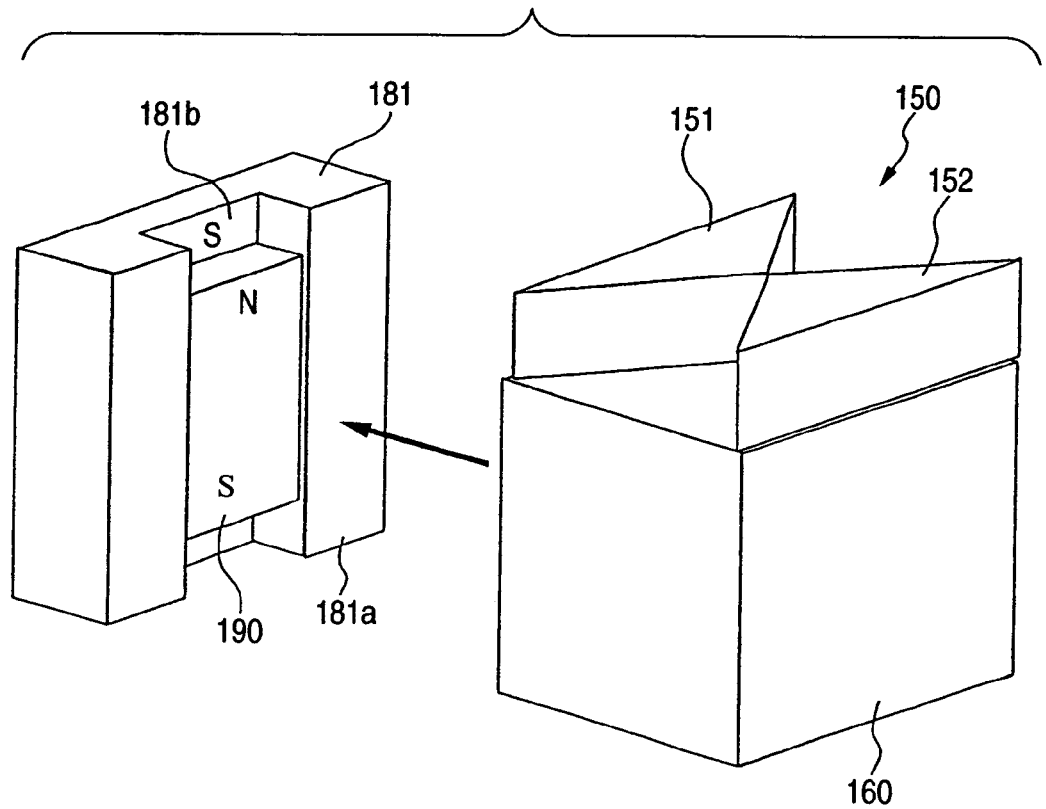
FIG. 3 is a perspective view of parts of the optical switch shown in FIG. 1.

In FIGS. 1 through 3, an optical switch 100 as an optical device of the present embodiment is a 2×2 optical switch of two inputs and two outputs having optical fibers 111, 121 and lenses 112, 122 to form input ports 110a, 120a, and having fiber collimators 110, 120 for making passing light beams to be parallel, optical fibers 131, 141 and lenses 132, 142 to form output ports 130a, 140a and having fiber collimators 130, 140 for making passing light beams to be parallel.

Herein, the fiber collimators 110, 120 compose a light input device for receiving the light beam from the outside of the optical switch 100 therein, while the fiber collimators 130, 140 compose a light output device for outputting the light beam received at the fiber collimators 110, 120 to the outside of the optical switch 100 from the inside.

The optical switch 100 has an optical path switching element 150 with right-angled prisms 151, 152 as reflecting mirror prisms, a slider 160 made of ferromagnetic substance such as an iron adhered and fixed with the optical path switching element 150, and a shaft 171, and this is provided with a solenoid actuator 170 as member-moving device for moving the optical path switching element 150 and the slider 160 in directions shown with arrows 150a, 150b, and a lever 172 for connecting a shaft 171 of the slider 160 and the solenoid actuator 170, and a guide mechanism 180 as a movement-guiding member for guiding movement of the optical path switching element 150 and the slider 160 by the solenoid actuator 170.

Herein, the optical path switching element 150 and the slider 160 are arranged in the optical paths between the fiber collimators 110, 120 and the fiber collimators 130, 140 and compose a light changing member for changing light beam.

Further, the solenoid actuator 170 moves the optical path switching element 150 between a position (called as "first position" hereafter) of inserting the optical path switching element 150 between the fiber collimators 110, 120 and the fiber collimators 130, 140 and a position (called as "second position" hereafter) of drawing out the optical path switching element 150 from between the fiber collimators 110, 120 and the fiber collimators 130, 140.

Incidentally, the guide mechanism 180 has a guide member 181 and a guide member 182. The guide member 181 is formed with a fixed guide surface 181a which is flat for contacting the slider 160 and a recess 181b. The guide member 181 has a magnet 190 as magnetic field generating unit fixed at a position of pressing the slider 160 against the guide member 181 owing to magnetic force by the generated magnetic field.

Herein, the magnet 190 is positioned in the recess 181b opposite to the slider 160 with respect to the fixed guide surface 181a of the guide member 181, such that the magnet 190 does not contact the slider 160 even when the guide member 181 contacts the slider 160 at the fixed guide surface 181a.

When the optical path switching element 150 and the slider 160 are at the first position, the fiber collimators 110, 120 130, 140 are adhered and fixed to the guide members 181, 182 of the guide member 180 by adjusting the position and angle.

Next, the operation of the embodied optical device will be referred to.

The slider 160 is attracted to the magnet 190 owing to magnetic force generated by the magnet 190 embedded in the guide member 181 of the guide mechanism 180, and is pressed against the guide member 181.

Given an electric signal from a controller (not shown), the solenoid actuator 170 moves the shaft 171 in response to the given electric signal in a direction indicated by the arrow 150b, thereby to move the slider 160 and the optical path switching element 150 connected to the shaft 171 via the lever 172 until a first position in the direction indicated by the arrow 150b. Since, here the slider 160 is pressed against the guide member 181 by the magnet 190, the slider 160 and the optical path switching element 150 move along the fixed guide surface 181a of the guide member 181.

When the optical path switching element 150 is located at the first position, as shown with the dotted line in FIG. 2, if a light goes into an optical fiber 111 through an input port 110a of the fiber collimator 110, it is transmitted within the optical fiber 111 and get out there from, and then the light beam enters into a lens 112. The light beam in the lens 112 passes therethrough and is brought substantially to be parallel and gets out from the lens 112, and thereafter the light beam is reflected twice by the right-angled prism 151 and enters into a lens 142 of the fiber collimator 140. The light beam in the lens 142 passes therethrough, and is condensed and gets out therefrom. Then, the light beam goes into an optical fiber 141, and the light beam therein is transmitted through the optical fiber 141 and is output from the optical fiber 141 through an output port 140a.

Further, when a light beam goes into an optical fiber 121 through an input port 120a of the fiber collimator 120, it is transmitted within the optical fiber 121 and get out therefrom, and then the light beam enters into a lens 122. The light beam in the lens 122 passes therethrough and is brought substantially to be parallel and gets out from the lens 122, and thereafter the light beam is reflected twice by the right-angled prism 152 and enters into a lens 132 of the fiber collimator 130. The light beam in the lens 132 passes therethrough, and is condensed and gets out therefrom. Then, the light beam goes into an optical fiber 131, and the light beam therein is transmitted through the optical fiber 131 and is output from the optical fiber 131 through an output port 130a.

Given an electric signal from a controller (not shown), the solenoid actuator 170 moves the shaft 171 in response to the given electric signal in a direction indicated by the arrow 150a, thereby to move the slider 160 and the optical path switching element 150 connected to the shaft 171 via the lever 172 until a second position in the direction indicated by the arrow 150a by a distance of more than height of the optical path switching element 150. Since, here the slider 160 is pressed against the guide member 181 by the magnet 190, the slider 160 and the optical path switching element 150 move along the fixed guide surface 181a of the guide member 181.

When the optical path switching element 150 is located at the second position, if a light beam goes into an optical fiber 111 through an input port 110a of the fiber collimator 110, it is transmitted within the optical fiber 111 and get out therefrom, and then the light beam enters into a lens 112. The light beam in the lens 112 passes therethrough and is brought substantially to be parallel and gets out from the lens 112, and thereafter the light beam is directly enters into a lens 132 of the fiber collimator 130. The light beam in the lens 132 passes therethrough, and is condensed and gets out therefrom. Then, the light beam goes into an optical fiber 131, and the light beam therein is transmitted through the optical fiber 131 and is output from the optical fiber 131 through an output port 130a.

Further, when a light beam goes into an optical fiber 121 through an input port 120a of the fiber collimator 120, it is transmitted within the optical fiber 121 and get out therefrom, and then the light beam enters into a lens 122. The light beam in the lens 122 passes therethrough and is brought substantially to be parallel and gets out from the lens 122, and thereafter the light beam directly enters into a lens 142 of the fiber collimator 140. The light beam in the lens 142 passes therethrough, and is condensed and gets out therefrom. Then, the light beam goes into an optical fiber 141, and the light beam therein is transmitted through the optical fiber 141 and is output from the optical fiber 141 through an output port 140a.

Namely, in dependence upon inserting the optical path switching element 150 into, or retracting out of a position between the fiber collimators 110, 120 and the fiber collimators 130, 140, the optical switch 100 may switch the optical paths so that the light beams output at the fiber collimator 110 and the fiber collimator 120 are received by the fiber collimator 130 and the fiber collimator 140 respectively, or so that the optical paths through which the light beams output at the fiber collimator 110 and the fiber collimator 120 are received by the fiber collimator 140 and the fiber collimator 130, respectively.

As explained above, since the slider 160 is pressed against the guide member 181 by the magnet 190, in comparison with the conventional optical switch, the optical switch 100 may precisely decide the position of the slider 160 to the guide mechanism 180 and the position shown with the arrow 160a of the path switching element 150 and the angle in the direction shown with the arrow 160b, so that the insertion loss may be reduced.

Further, since the slider 160 is pressed against the guide member 181 by the magnet 190, the optical switch 100 can prevent the slider 160 and the optical path switching element 150 from moving by the external vibrations and the light beams output at the fiber collimators 110, 120 from irradiating to the optical path switching element 150.

Further, since the magnet 190 does not contact the slider 160 even when the guide member 181 contacts at the fixed guide surface 181a with the slider 160, the optical switch 100 can check magnetic particle from occurring owing to wearing of the magnet 190, and avoid characteristics from changing by occurrence of magnetic particles. Incidentally, it is possible to insert wear resistant non-magnetic materials such as glass plate easily processed to be smooth between the slider 160 and the magnet 190.

If the guide member 181 is formed with materials such as hard stainless steel plates, ceramics as alumina, or quartz glass, a part to be formed with a fixed guide face 181a may be provided with a wear resistant property. Further, if the guide member 181 is formed with a steel material as a carbon steel, and the only part to be formed with the fixed guide face is carried out with a wear resistant surface treatment as a diamond like carbon, the part to be formed with a fixed guide face 181a may be provided with the wear resistant property. If the part to be formed with the fixed guide face 181a of the guide member 181 is provided with the wear resistant property, the optical switch 100 can prevent the insertion loss from changing by wearing at the part to be formed with the fixed guide face 181a of the guide member 181.

Incidentally, the magnet 190 maybe a sintered magnet such as ferrite, SmCo, or NdFeB, a plastic magnet, a bond magnet, or a rubber magnet having such materials kneaded therein.

Second Embodiment

Firstly the structure of the optical device of the second embodiment will be explained.

Figure 4:
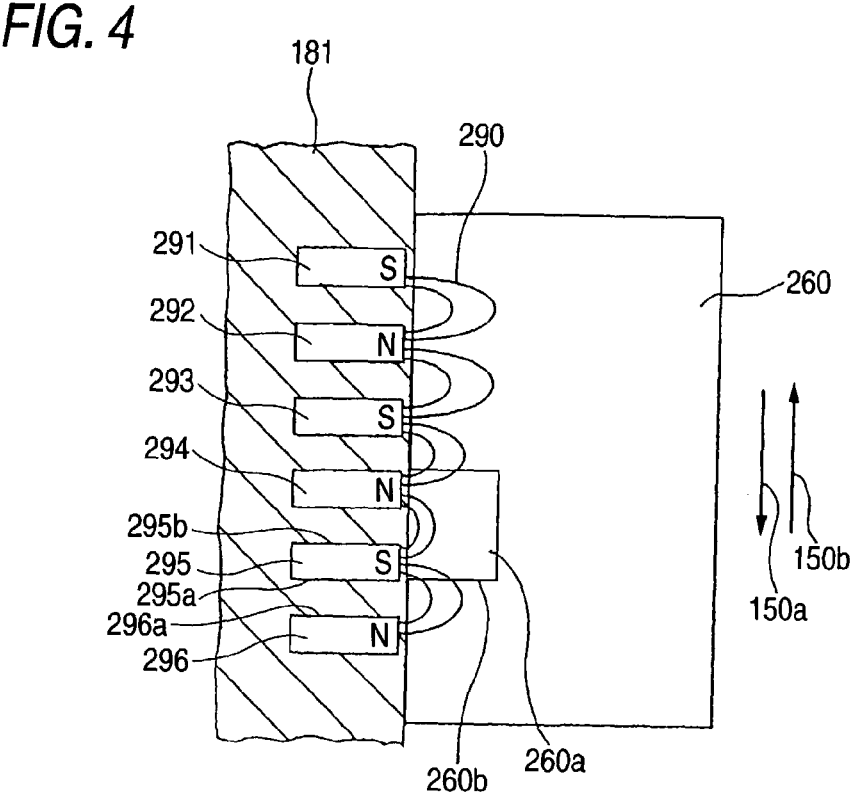
FIG. 4 is a cross sectional view of a part of the optical switch of the second embodiment of the invention.
Figure 5:
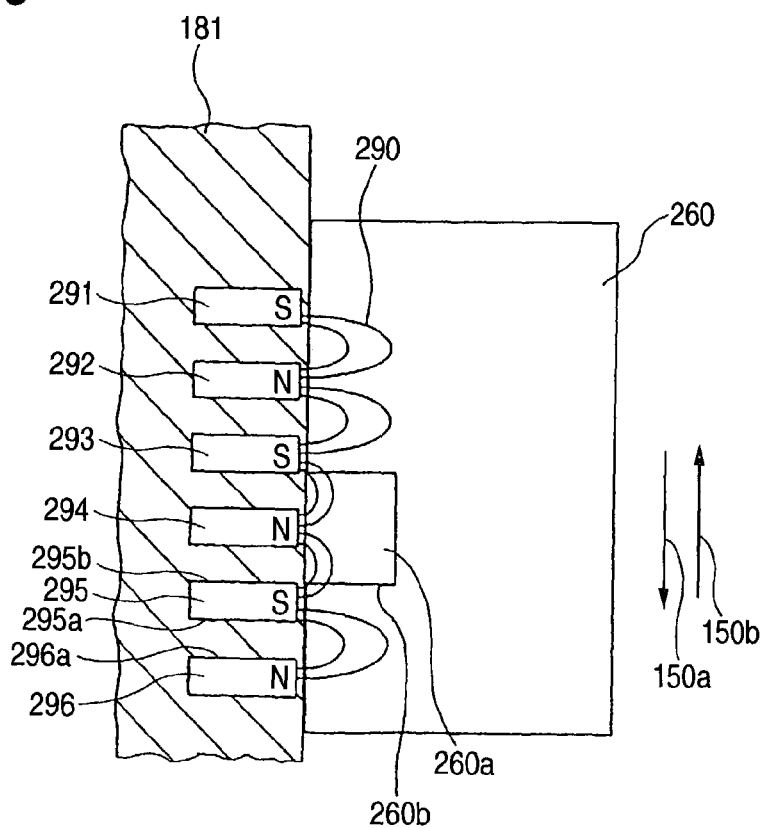
FIG. 5 is a cross sectional view of a part of the optical switch of FIG. 4, but under a different condition.

As shown in FIGS. 4 and 5, the optical switch 100 (see FIG. 1) as the embodied optical device is provided with a slider 260 as a light changing member in place of the slider 160 of the first embodiment (see FIG. 1) and is provided with magnets 291, 292, 293, 294, 295, 296 as magnetic field generating unit in place of the magnet 190 of the first embodiment (see FIG. 1).

The slider 260 is a ferromagnetic substance and has a cutout (groove) 260a formed at a position opposite to the magnets 291, 292, 293, 294, 295, 296.

The magnets 291, 292, 293, 294, 295, 296 in an example shown with lines of magnetic force 290 have multi-poles magnetized at the positions where the magnets are magnetic coupling to one another. Even in case the individual magnets may be considered to be single and have no or extremely weak magnetic connection with one another, attracting force due to the magnetic force of the individual magnets is varied, and the same effect may be obtained.

Next, the operation of the embodied optical device will be explained.

Since the optical switch 100 is provided with the magnets 291, 292, 293, 294, 295, 296 having multi-poles magnetized, in comparison with a single magnet having magnetized with magnetic force equal to total magnetism of the magnets 291, 292, 293, 294, 295, 296, the optical switch 100 can restrain reduction of magnetism as a whole of the magnets 291, 292, 293, 294, 295, 296 with respect to external environments such as high temperatures or time-passing elapse, and may maintain the insertion loss in a long period of time.

Further, since the optical switch 100 is provided with the magnets 291, 292, 293, 294, 295, 296 having multi-poles magnetized at the positions where the magnets are magnetic coupling to one another, the optical switch 100 can restrain reduction of magnetism as a whole of the magnets 291, 292, 293, 294, 295, 296 with respect to external environments such as high temperatures or time-passing elapse, and may maintain the insertion loss in a long period of time.

The strength of magnetic force of the magnets 291, 292, 293, 294, 295, 296 for attracting the slider 260 is decided by strength of the magnetic fields generated by the magnets 291, 292, 293, 294, 295, 296 and the magnetic property of slider 260. The strength of magnetic fields generated by the magnets 291, 292, 293, 294, 295, 296 is decided by inherent material property of the magnets 291, 292, 293, 294, 295, 296, an overlap area of the slider 260 and the magnetic poles.

The line of magnetic force from an N pole goes into a near S pole, while the line of magnetic force from the S poles goes into the near N pole, and if the slider 260 made of the ferromagnetic substance is located in the vicinity of the magnetic pole, the line of magnetic force passes the interior of the slider 260. However, at a part of forming the cutout 260a of the slider 260, the slider is not present in the neighborhood of the magnetic poles, the line of magnetic force does not pass the interior of the slider 260.

Therefore, the larger is the area of superimposing the part of forming the cutout 260a of the slider 260 and the magnetic poles of the magnets, the smaller is the strength of magnetic force of the magnets 291, 292, 293, 294, 295, 296 for attracting the slider 260, while the smaller is the area of superimposing the part of forming the cutout 260a of the slider 260 and the magnetic poles of the magnets, the larger is the strength of magnetic force of the magnets 291, 292, 293, 294, 295, 296 for attracting the slider 260.

For simplifying the explanation, if the magnets 291, 292, 293, 294, 295, 296 have the uniform structure of the magnetic poles in a depth axis in FIGS. 4 and 5, the width of magnetic poles in the directions indicated by the arrows 150a and 150b force is proportional to the area of superimposing the slider 260 and the magnetic poles.

Provided that the width of the cutout 260a, the width of N pole, the width of S pole, and the width between N and S poles are W, W1, W2, W3 respectively and W=W1+W2+W3, and W1=W2=W3, the width of the pole or the width between the magnetic poles to be overlapped with the cutout 260a are changed by moving the slider 260, and the strength of magnetic force of the magnets 291, 292, 293, 294, 295, 296 attracting the slider 260 is changed.

Comparing with a case that the position of the edge 260b at the side of the magnet 296 of the cutout 260a is opposite to the position of the edge 296a at the side of the magnet 295 of the magnet 296 (namely the slider 260 is at the second position), when the slider 260 moves in the direction indicated with the arrow 150b and is opposite to the position of the edge 295a at the side of magnet 296 of the magnet 295 as shown in FIG. 4 (namely the slider 260 is located between the first and second positions), the strength of magnetic force of the magnets 291, 292, 293, 294, 295, 296 attracting the slider 260 is reduced.

Further, when the slider 260 moves in the direction shown with the arrow 150b and the position of the edge 260b of the cutout 260a is opposite to the position of the edge 295b at the magnet side 294 of the magnet 295 as shown in FIG. 5 (namely the slider 260 is at the first position), the strength of magnetic force of the magnets 291, 292, 293, 294, 295, 296 attracting the slider 260 is again increased, and becomes equal to the case that the edge position at the side of the magnet 296 of the cutout 260a.

Namely, the slider 260 is formed with the cutout 260a at the position of varying magnetic force of magnetic field generated by the magnets 291, 292, 293, 294, 295, 296 in response to movement by the solenoid actuator 170 (see FIG. 1).

As explained above, when the slider 260 is at the first position, since the strength of magnetic force of the magnets 291, 292, 293, 294, 295, 296 for attracting the slider 260 is larger in comparison with the case that the slider 260 is located between the first and second positions, the optical switch 100 stably secures the optical path switching element 150 (see FIG. 1) to the guide mechanism 180 (see FIG. 1) and the light beams output at the fiber collimators 110, 120 can received by the fiber collimators 140, 130 by the optical path switching element 150.

Further, when the slider 260 is at the second position, since the strength of magnetic force of the magnets 291, 292, 293, 294, 295, 296 for attracting the slider 260 is larger in comparison with the case that the slider 260 is located between the first and second positions, the optical switch 100 can prevent the slider 160 and the optical path switching element 150 from moving by the external vibrations with respect to the guide mechanism 180 and the light beams output at the fiber collimators 110, 120 from irradiating to the optical path switching element 150.

Further, when the slider 260 is moved between the first and second positions, since the strength of magnetic force of the magnets 291, 292, 293, 294, 295, 296 for attracting the slider 260 is smaller than the case that the slider 260 is located between the first or second position, and the friction between the slider 260 and the guide member 180 may be reduced, the optical switch 100 can decrease wear of the slider 260 and the guide member 180, and maintain the insertion loss for a longer period of time.

Further, when the slider 260 is moved between the first and the second positions, since the optical switch 100 can decrease wear of the slider 260 and the guide member 180 in comparison with the case that the slider 260 is at the first and second positions, it can decrease drive force of the slider 260 and the optical path switching element 150 by a solenoid actuator 170, and save electric power.

Figure 6:
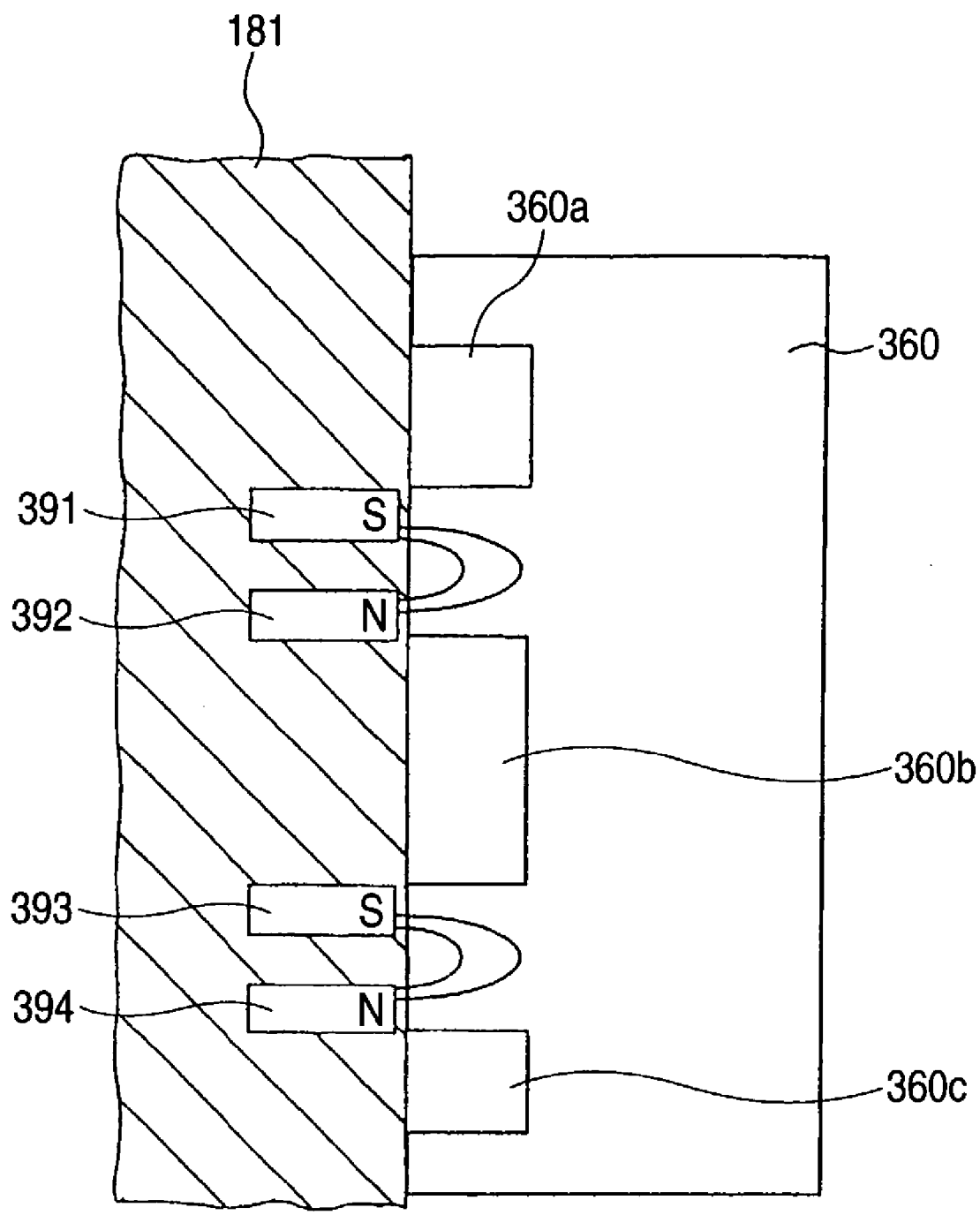
FIG. 6 is a cross sectional view of a part of the optical switch of the second embodiment of the invention, but under a different example from those of FIGS. 4 and 5.

Incidentally, as shown in FIG. 6, if the positions of the magnets 391, 392, 393, 394 and the positions of the cutouts 360a, 360b, 360c of the slider 360 are divided into more than two, since the optical switch 100 can reduce the contacting area between the slider 360 and the guide member 181 and reduce the friction between the slider 360 and the guide member 181, the angular variation owing to wearing of the contacting area may be restrained, and the insertion loss may be maintained for a longer period of time.

Third Embodiment

At first, the structure of the optical device of the third embodiment will be explained.

Figure 7:
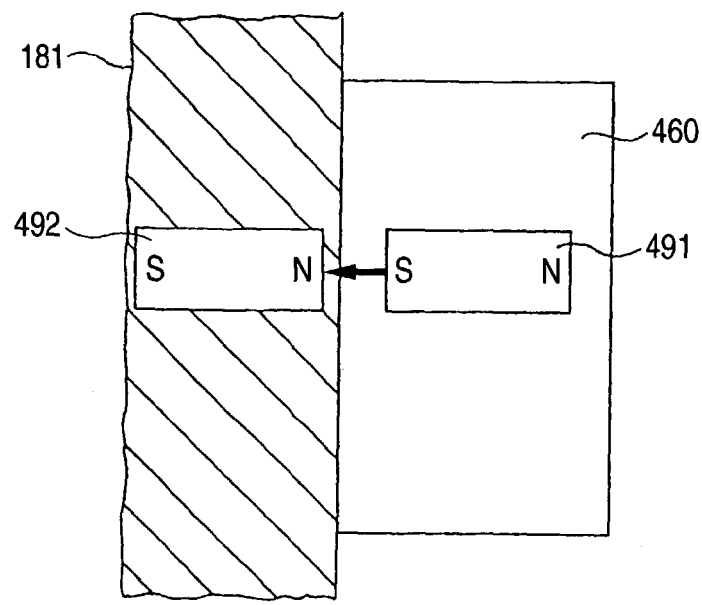
FIG. 7 is a cross sectional view of a part of the optical switch of the third embodiment of the invention.

As shown in FIG. 7, the optical switch 100 (see FIG. 1) as the embodied optical device is provided with a slider 460 as a light changing member in place of the slider 160 of the first embodiment (see FIG. 1) and is provided with magnets 491, 492.

The magnet 491 composes a first magnetic field generating unit which is embedded to fix in the slider 460, and the magnet 492 composes a second magnetic field generating unit which is fixed at a predetermined position of the guide member 181 of the guide mechanism 180 (FIG. 1).

Further, the magnets 491, 492 are arranged at positions where an S pole of the magnet 491 and an N pole of the magnet 492 magnetically attract each other when the slider 460 is at the first position.

Next, operation of the embodied optical device of the embodiment will be explained.

When the slider 460 is at the first position, since the S pole of the magnet 491 and the N pole of the magnet 492 magnetically attract each other, the slider 460 is pressed against the guide member 181 by the magnets 491, 492.

Therefore, the optical switch 100 can maintain the angular precision of the slider 460 and the optical path switching element 150 (FIG. 1) to the guide mechanism 180.

Figure 8:
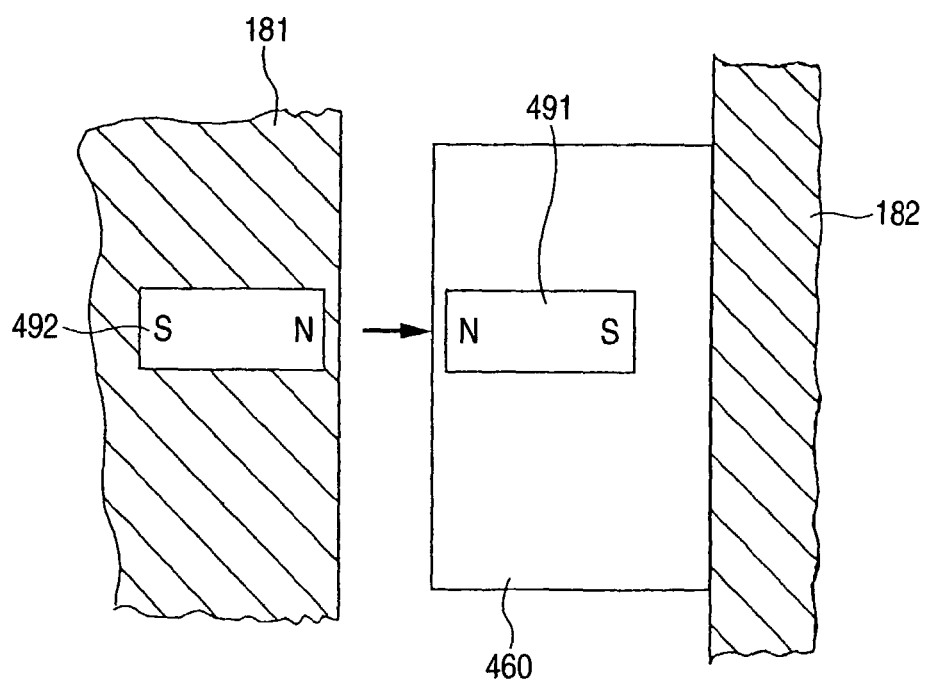
FIG. 8 is a cross sectional view of a part of the optical switch of the third embodiment of the invention, but shown in a different example from that of FIG. 7.

In FIG. 7, reference has been made to the case the S pole of the magnet 491 and the N pole of the magnet 492 magnetically attract each other. The magnetic pole of the magnet 491 is reversed, and even if, as shown in FIG. 8, the N pole of the magnet 491 and the N pole of the magnet 492 are arranged to repulse each other, when the slider 460 is at the first position, the slider 460 is pressed against the guide member 182 by the magnets 491, 492, and thus the optical switch 100 can maintain the angular precision of the slider 460 and the optical path switching element 150 to the guide mechanism 180.

As mentioned above, even if the solenoid actuator 170 is unable to position the slider 460 as predetermined to the guide mechanism 180, the optical switch 100 can position the slider 460 to the guide mechanism 180 as predetermined.

By the way, the magnets 491, 492 may be electro-magnets as well as permanent magnets. If the magnets 491, 492 are the electro-magnets, the direction and the strength of the electric current flowing through the magnets 491, 492 may be adjusted to make the magnets 491, 492 attract or repulse each other.

Fourth Embodiment

At first, the structure of the optical device of the fourth embodiment will be described.

Figure 9:
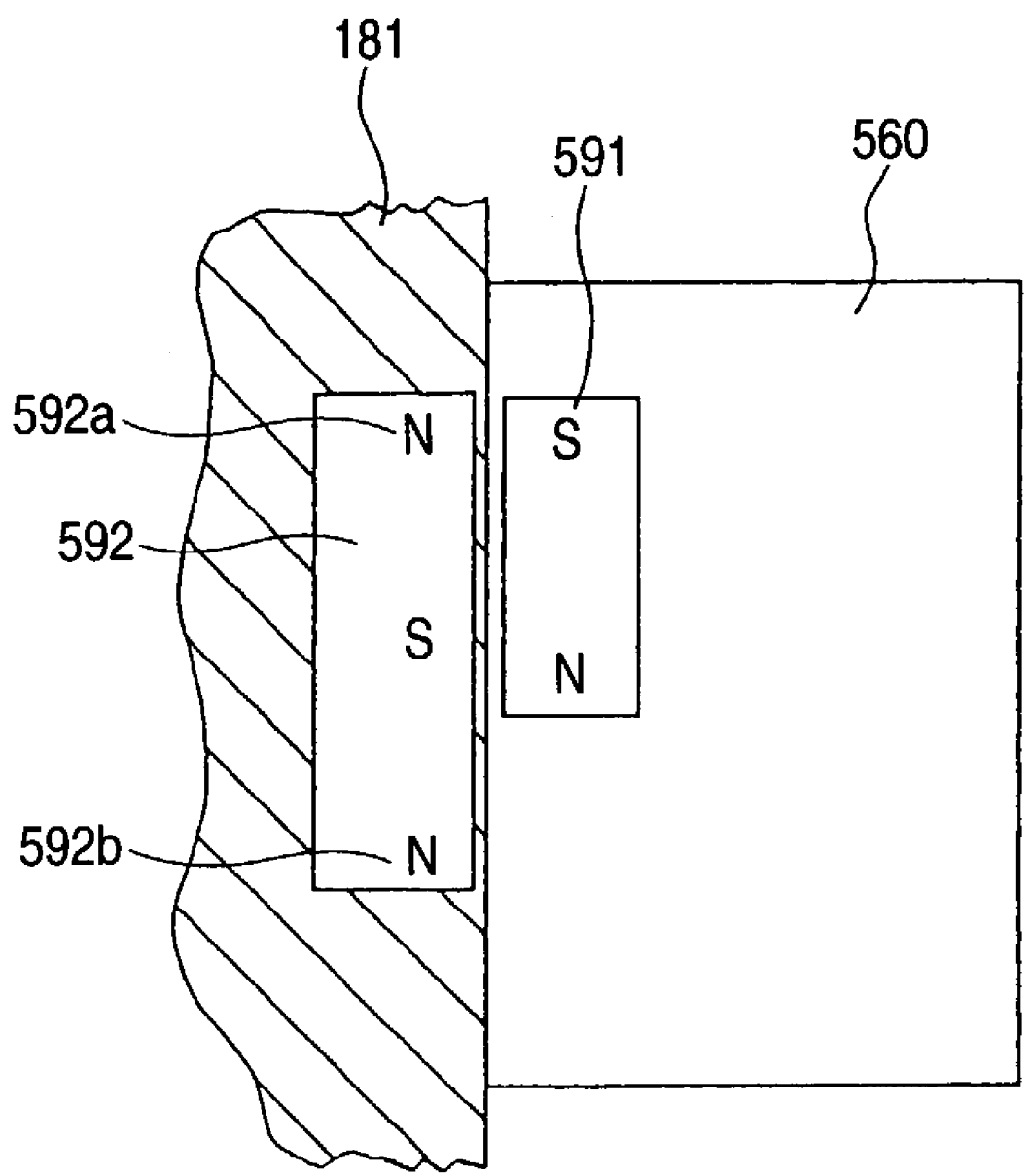
FIG. 9 is a cross sectional view of a part of the optical switch of the fourth embodiment of the invention.
Figure 10:
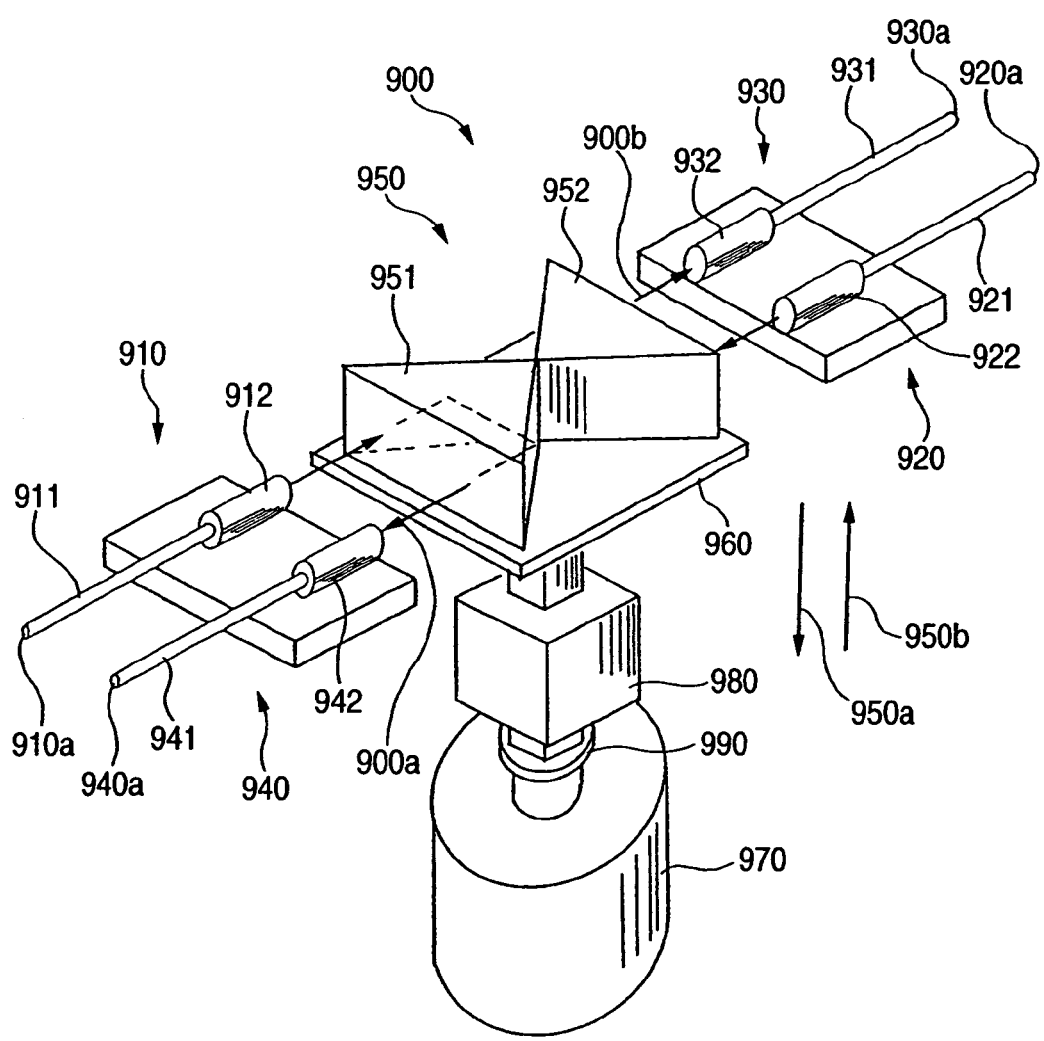
FIG. 10 is a perspective view of a conventional optical switch.
Figure 11:
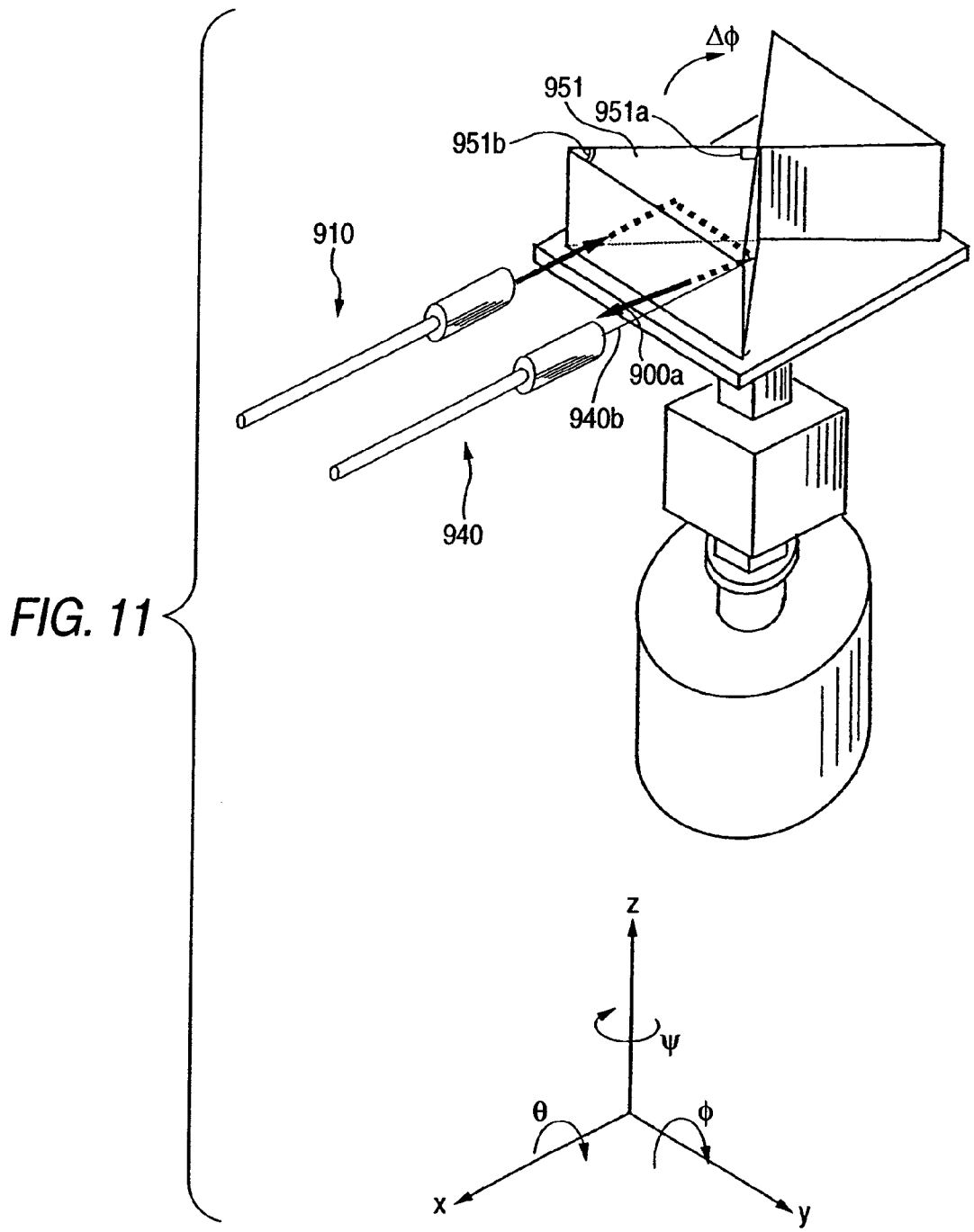
FIG. 11 is a perspective view of apart of the conventional optical switch of FIG. 10.

As shown in FIG. 9, the optical switch 100 (see FIG. 1) as the embodied optical device is provided with a slider 560 as a light changing member in place of the slider 160 of the first embodiment (see FIG. 1) and is provided with magnets 591, 592 in place of the magnet 190 (FIG. 1).

The magnet 591 composes a first magnetic field generating unit which is embedded to fix in the slider 560, and the magnet 592 composes a second magnetic field generating unit which is fixed at a predetermined position of the guide member 181 of the guide mechanism 180 (FIG. 1). Further, the magnet 591 has a magnetic pole pattern SN as shown and the magnet 592 has a magnetic pole pattern NSN as shown, and when the slider 560 is at the first position relative to the guide member 181 as shown, the S pole of the magnet 591 and the N pole 592a of the magnet 592 magnetically attract each other, while the N pole of the magnet 591 and the S pole of the magnet 592 magnetically attract each other, and when the slider 560 is at the second position relative to the guide member 181, the S pole of the magnet 591 and the S pole of the magnet 592 magnetically repulse each other, while the N pole of the magnet 591 and the N pole 592b of the magnet 592 magnetically repel each other.

Namely, the magnet 591 and the magnet 592 are arranged at the positions so that the magnetic force generated by the magnetic fields is varied in accordance with movement of the slider 560 by the solenoid actuator 170 (FIG. 1).

Next, the operation of the embodied optical device will be explained.

When the slider 560 is moved to the first position by the solenoid actuator 170, since the magnet 591 and the magnet 592 magnetically attract each other as mentioned above, the slider 560 is pressed against the guide member 181 by the magnet 591 and the magnet 592. Thus the optical switch 100 is able to maintain the angular precision of the slider 560 and the optical path switching element 150 (FIG. 1) with respect to the guide mechanism 180.

Further, when the slider 560 is moved to the second position by the solenoid actuator 170, since the magnet 591 and the magnet 592 magnetically repulse each other as mentioned above, the slider 560 is separated from the guide member 181 by the magnet 591 and the magnet 592. Therefore, when the slider 560 move to between the first and second positions, the optical switch 100 may decrease friction between the slider 560 and the guide member 180, and therefore reduce wearing of the slider 560 and the guide member 180, and thus may maintain the insertion loss for a longer period of time. Further, when the slider 560 is moved between the first and second positions, since the optical switch 100 can reduce friction between the slider 560 and the guide member 180, and lower drive force of the slider 560 by the solenoid actuator 170 and therefore may save the electric power.

By the way, in the respective above embodiments, the right-angled prisms 151, 152 are exemplified as the optical path switching element 150, but the invention may employ not only the right-angled prisms but also flat mirrors, other mirrors or a fiber-type mirror element having collimator lenses arranged opposite ends of optical fiber or a combination of liquid crystal and multi-refraction material.

Incidentally, in the above embodiments, the optical switch 100 is exemplified as the optical device for switching the optical path, but according to the invention, the optical device may be other type such as a variable-type optical attenuator for varying the output Optical Power, wavelength or pulse width.

In the foregoing embodiments, the optical path switching element 150 is exemplified as the light changing member for switching the optical path, but according to the invention, other optical elements such as shutters are available.

In the above embodiments, the light changing member is linearly moved, but according to the invention, the light changing member may similarly perform rotating movement. For example, as to the rotating movement of a disk or a swing arm, if the disk or the swing arm is pressed against the movement-guide member, the angular precision of the disk or the swing arm may be maintained. Further, in case a ball member is moved along a cup-like spherical surface (called as "cup surface" hereafter) formed at a member (called as "cup member" hereafter), the ball member may be magnetically pressed against the cup member. Thus the angular precision of the ball member may be maintained along the cup surface.

In the third and fourth embodiments, electromagnet is available for the magnetic field generating unit which integrally moves with the slider.

As explained above, according to the invention, it is possible to offer the optical device enabling to reduce the insertion loss in comparison with the conventional ones.

What is claimed is:

1. An optical device comprising:
   a light input device through which a light beam is input from an outside;
   a light output device through which the light beam input through the light input device is output to the outside;
   a light changing member arranged in an optical path formed between the light input device and the light output device;
   an actuating device for moving the light changing member;
   a movement-guiding member for guiding movement of the light changing member by the actuating device; and
   a magnetic field generating unit for generating a magnetic field,
   wherein the light changing member is brought into a press contact with the movement-guiding member via magnetic force generated by the magnetic field wherein at least a part of the light changing member is provided with a ferromagnetic substance, and
   a groove is formed so that the magnetic force via the magnetic field generated by the magnetic field generating unit is changed when said light changing member is moved.

2. An optical device as defined in claim 1, wherein a plurality of magnetic field generating units are arranged.

3. An optical device as defined in claim 1, wherein the magnetic field generating unit includes a first magnetic field generating unit fixed to the light changing member and a second magnetic field generating unit arranged at a predetermined position with respect to the movement-guiding member.

4. An optical device as defined in claim 3, wherein the first magnetic field generating unit and the second magnetic field generating unit are arranged at positions which changes the magnetic force by the magnetic field generated in accordance with a movement of the light changing member.

* * * * *